United States Patent [19]

Gruss et al.

[11] Patent Number: 5,297,452
[45] Date of Patent: Mar. 29, 1994

[54] TRANSMISSION UNIT FOR A MOTOR VEHICLE HAVING TWO POWERED AXLES

[75] Inventors: Roland Gruss, Jembke; Klaus Wiese, Wolfenbüttel; Eberhard Diessner, Wolfsburg, all of Fed. Rep. of Germany

[73] Assignee: Volkswagen AG, Wolfsburg, Fed. Rep. of Germany

[21] Appl. No.: 828,915
[22] PCT Filed: Jul. 14, 1990
[86] PCT No.: PCT/EP90/01159
§ 371 Date: Mar. 26, 1992
§ 102(e) Date: Mar. 26, 1992
[87] PCT Pub. No.: WO91/01898
PCT Pub. Date: Feb. 21, 1991

[30] Foreign Application Priority Data

Jul. 29, 1989 [DE] Fed. Rep. of Germany ....... 3925213

[51] Int. Cl.$^5$ ...................... F16H 57/04; F16H 37/08
[52] U.S. Cl. ...................... 74/467; 180/233; 184/6.12; 184/11.2; 184/13.1
[58] Field of Search ............... 74/467; 180/233; 184/11.1, 11.2, 13.1, 6.12; 475/159, 160, 206, 221

[56] References Cited

U.S. PATENT DOCUMENTS

| | | | |
|---|---|---|---|
| 3,162,269 | 12/1964 | Reed | 184/6 |
| 4,205,739 | 6/1980 | Shelby et al. | 192/113 B |
| 4,359,909 | 11/1982 | Sogo | 74/467 |
| 4,605,087 | 8/1986 | Ashauer et al. | 180/248 |
| 4,697,470 | 10/1987 | Sasaki et al. | 475/206 |
| 4,738,152 | 4/1988 | Takimura et al. | 475/160 X |
| 5,041,068 | 8/1991 | Kobayashi | 475/206 X |

FOREIGN PATENT DOCUMENTS

| | | |
|---|---|---|
| 0198812 | 10/1986 | European Pat. Off. |
| 825359 | 3/1952 | Fed. Rep. of Germany |
| 3317247 | 11/1984 | Fed. Rep. of Germany |
| 3506727 | 2/1985 | Fed. Rep. of Germany |
| 60-179549 | 9/1985 | Japan ................ 475/160 |

Primary Examiner—Allan D. Herrmann
Attorney, Agent, or Firm—Brumbaugh, Graves, Donohue & Raymond

[57] ABSTRACT

A transmission system for a motor vehicle with two powered axles has an engine aligned perpendicular to the driving direction and a transmission parallel to the axis of the engine shaft and includes an angle gear housing flangemounted on the side of the transmission housing, both housings having a lubricant supply for centrifugal or splash lubrication of the corresponding gear parts. The lubricant supplies, which are separated from each other by a partition, are interconnected by at least one first partition opening which serves as a lubrication inlet and at least one second partition opening which serves as a lubrication return. The second partition opening is located not below a first horizontal plane which passes approximately through the lower edge of a shaft bearing arrangement in the partition for the connecting shaft and the first partition opening is located above a second horizontal plane which passes approximately through the uppermost second partition opening. In addition, a lubricant-collecting and -conducting device is located inside the transmission housing.

5 Claims, 3 Drawing Sheets

TRANSMISSION UNIT FOR A MOTOR VEHICLE HAVING TWO POWERED AXLES

BACKGROUND OF THE INVENTION

This invention relates to transmissions for motor vehicles having two powered axles and, more particularly, to transmissions for vehicles having an engine mounted transverse to the direction of travel and having a transmission with its centerline parallel to the engine shaft.

In such known transmissions, as described, for example, in German Offenlegungsschrift No. 33 17 247, one driven axle of the vehicle is powered by an output drive gear which also serves as a flywheel for a centrifugal or injection lubricating system for the transmission. To power the second driven axle of the vehicle, the drive system contains an angle drive connected to the transmission output drive gear by a connecting shaft which may be a hollow shaft. The housing for the angle drive is arranged on the side of the transmission housing adjacent to the output drive gear connection for the transmission and a shaft support for the connecting shaft leading from the output drive gear to the angle drive preferably consists of tapered roller bearings mounted in a partition between the two housings. Both housings are filled with a supply of lubricant for centrifugal or injection lubrication of the gear parts contained therein.

The lubricant supply for a centrifugal and injection lubricated transmission should be so proportioned that adequate lubrication is provided in each phase of operation while, at the same time, the quantity of lubricant used is limited to the minimum actually required so as to inhibit heating resulting from agitation that would impair the lubricating function of the lubricant. Problems can arise from this, particularly in the case of high-power angle drives, i.e., angle drives transmitting a large amount of power.

In the first place, the interior volume of the angle drive is relatively small, compared to that of the transmission, and hence its lubricant content is correspondingly small. In the second place, a high-power transmission always involves a correspondingly high evolution of heat which has to be removed by the lubricating oil. For reasons of space, an effort is maintained to provide the greatest compactness, economy of space and small volume in the design of the angle gear but, at the same time, the oil supply in the comparatively confined angle gear housing cannot easily be replenished. Any additional oil would escape through the bearings for the connecting shaft into the transmission housing, where the oil level when the vehicle is stationary is generally lower than the shaft bearings.

SUMMARY OF THE INVENTION

Accordingly, it is an object of the present invention to provide a motor vehicle transmission arrangement which overcomes the above-mentioned disadvantages of the prior art.

Another object of the invention is to provide a transmission arrangement for a vehicle with two driven axles which has a compact and space-saving configuration and requires minimum lubricant supply, even with high-power transmission, while providing adequate and dependable lubrication of the parts of the transmission and the angle gear in every phase of operation of the vehicle.

These and other objects of the invention are attained by providing lubricant inlet and outlet openings in a partition separating the transmission and angle drive compartments of the drive system to produce a constant exchange of lubricant between the oil supplies in the transmission and the angle drive during operation so that, despite a comparatively small supply in the angle drive, which would not by itself be sufficient for high-power operation with a conventional design, dependable and adequate lubrication of the angle drive is provided in all phases of operation.

BRIEF DESCRIPTION OF THE DRAWINGS

Further objects and advantages of the invention will be apparent from a reading of the following description in conjunction with the accompanying drawings in which.

DESCRIPTION OF PREFERRED EMBODIMENTS

Figure 1:
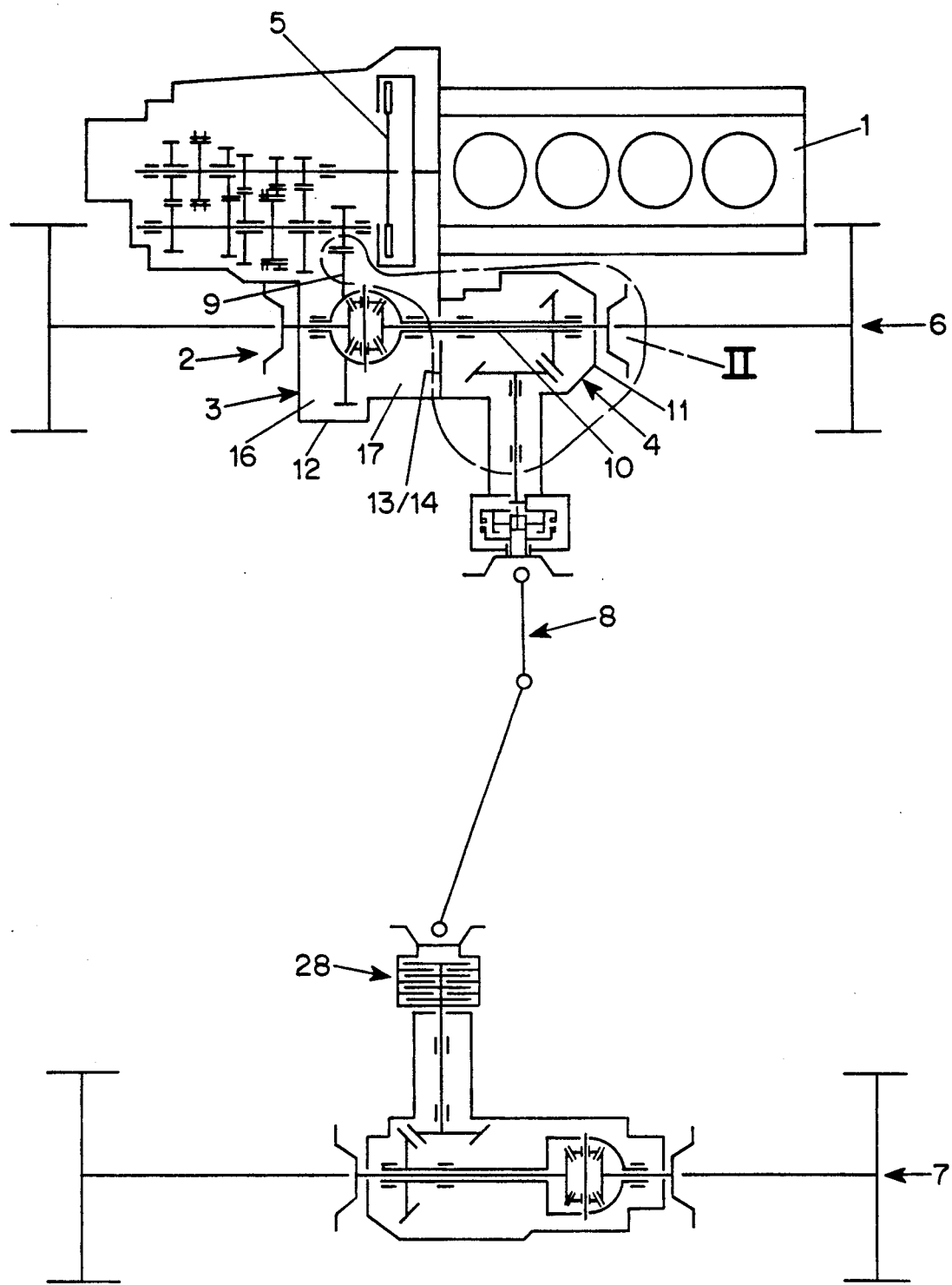
FIG. 1 is a schematic illustration of the drive train of a motor vehicle having two powered axles and a transverse engine as well as a transmission system with its axis parallel to the engine shaft arranged according to a representative embodiment of the invention.

In the representative embodiment of a drive system of an all-wheel-drive motor vehicle schematically illustrated in FIG. 1, one powered axle 6, which is the front axle, is driven continuously. The second powered axle 7, which is the rear axle, is driven automatically by means of a Visko coupling 28 disposed in a universal shaft 8 extending between the first powered axle 6 and the second powered axle 7 so that the two powered axles are substantially continuously coupled together torquewise.

An engine 1, mounted transversely to the direction of travel, has a clutch 5 and a transmission 3 with parallel axes at the output end of the engine. The wheels of the first powered axle 6 are driven directly by way of a transmission output drive gear 9, a front-axle differential, not specially numbered, and conventional half driveshafts.

Driving the wheels of the second powered axle is accomplished by a universal shaft 8 coupled to the transmission 3 by an angle drive 4. The Visko coupling 28 transmits power from the shaft 8 to a rear axle gear, not specially numbered, and conventional rear wheel half driveshafts.

The transmission 3 and the angle drive 4 are structurally integrated in a transmission unit 2, the angle drive housing 11 being mounted laterally on a transmission housing 12 at a location adjacent to the output drive gear 9. Each of the two gear housings 11 and 12 is filled with a supply of lubricant for centrifugal or injection lubrication of their gear parts, the output drive gear 9 in the transmission 3 serving also as a flywheel for such injection lubrication.

The angle drive 4 provided to transmit power to the second powered axle 7 is driven by the output drive gear 9 through a connecting shaft 10. In the illustrated embodiment, the connecting shaft is a hollow shaft, mounted in the housing of the front axle differential, not specially numbered, which also supports the transmission output drive gear 9.

Figure 2:
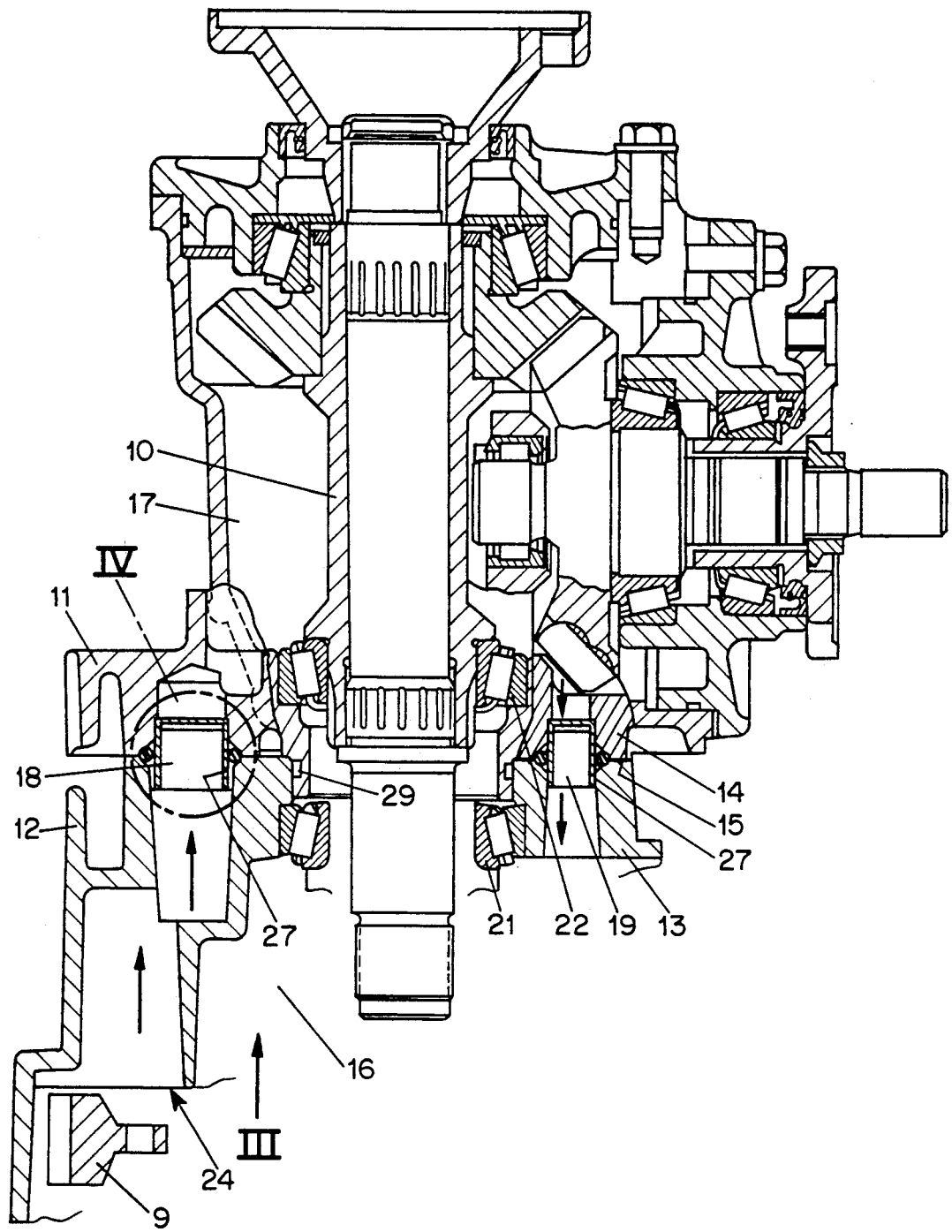
FIG. 2 is a sectional view of the detail marked II in FIG. 1 at the line of section marked II in FIG. 3.

As illustrated in the sectional view of FIG. 2, the support for the connecting shaft 10 is a bearing consisting of two taper roller bearings 21 and 22 mounted in two partition members 13 and 14 having a common surface 15 which separate a transmission compartment 16 and an angle gear compartment 17 from each other.

The partition members 13 and 14 thus separate the lubricant supplies for the two gear compartments 16 and 17 from each other and a first wall opening 18 provides an oil inlet leading from the transmission 3 to the angle drive 4 while a second wall opening 19 provides an oil return leading from the angle drive 4 to the transmission 3. Instead of only one such wall opening for each of the oil inlet and the return, several such wall openings may be provided in each case, if required.

Figure 3:
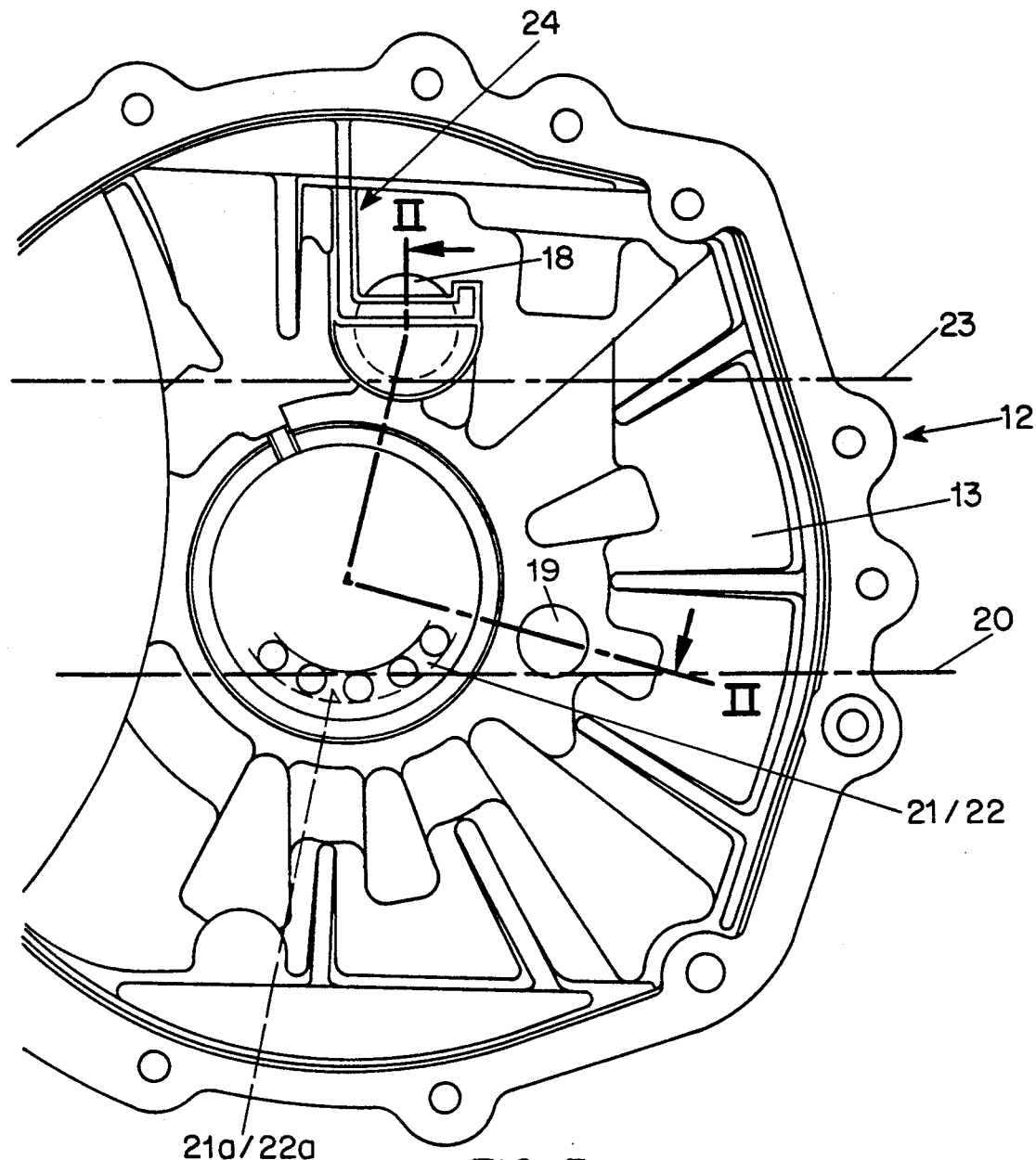
FIG. 3 is a sectional view of the same detail looking in the direction of the arrow marked III in FIG. 2.

The second wall opening 19, providing the lubricant return, is located so that it does not extend below a first horizontal plane 20, shown in FIG. 3, which passes approximately through the lower extremity 21a, 22a of the effective axial opening of the shaft bearings 21 and 22 in the partition members 13 and 14 for the connecting shaft 10. On the other hand, the first wall opening 18 which serves as an oil inlet, is located above a second horizontal plane 23, passing adjacent to the top of the second wall opening 19. In FIG. 3, which shows an inside view of the partition 13 on the angle drive side of the transmission housing 12, these spatial relations are clearly apparent.

Inside the transmission housing 12, as best seen in FIGS. 2 and 3, a lubricant trap and conduit arrangement 24, consisting of guide ribs or the like, is also provided to collect oil projected from the front-end drive 9 for centrifugal or injection lubrication and divert it to the first wall opening 18. Because the first wall opening 18 is above the level of the lubricant in the angle drive housing, some of the lubricant originally contained in the transmission housing is conducted during operation into the comparatively confined angle drive housing 11. At the same time, a portion of the lubricant supply in the angle drive housing 11 is returned to the transmission housing 12 by way of the lower second wall opening 19. This occurs when the oil level in the angle gear housing rises above the first horizontal plane marked 20 in FIG. 3.

Through this constant circulation of oil between the lubricant supplies in the two gear housings, a dependable and effective lubrication of the angle drive is provided, despite high-power operation of the angle drive. Even with highpower operation, no excessive heating of the angle drive lubricant supply will occur because, with a comparatively low oil level in the angle drive, there will be no appreciable agitation to heat the oil.

Instead of only one oil trap and oil conduit arrangement 24, a second similar arrangement may, of course, be provided, if required.

Advantageously, the oil trap and conduit arrangement 24 can be an integral component of a cast transmission housing 12. In principle, of course, the oil trap and conduit arrangement may alternatively be a separate component mounted in a suitable location inside the transmission housing.

In the illustrated embodiment, the angle drive housing 11 is a separate component mounted by lateral flanges to the transmission housing 12. This design is especially advantageous when the transmission unit has an ordinary mass-production transmission housing for a motor vehicle having only one powered axle. However, the invention is not limited to such designs.

In the case of transmission units with transmission and angle drive housings flanged together, a secure seal must be provided at the common surface 15. In conventional transmission units which do not have the aforementioned wall openings, a sealing ring 29, shown in FIG. 2, is arranged in the radially interior region, close to the connecting shaft. It is evident that, in the arrangement of the two gear compartments 16 and 17 with communicating wall openings 18 and 19, additional sealing measures are required. In principle, it would be conceivable for this purpose to provide a corresponding sealing ring or the like in the outer marginal region of the parting joint. However, such a sealing arrangement would be comparatively expensive and complicated to manufacture, because such a transmission unit will generally have a noncircular outer contour in the region of the common surface.

Figure 4:
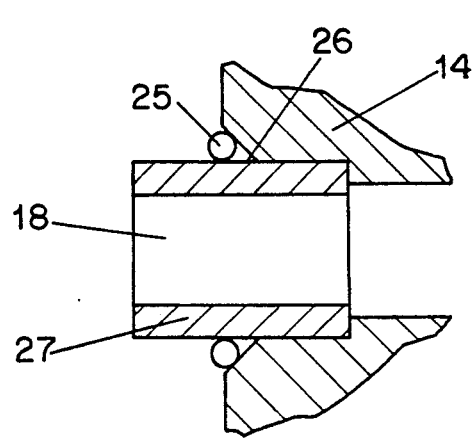
FIG. 4 is an enlarged fragmentary view showing the detail marked IV in FIG. 2.

Advantageously, therefore, in the illustrated embodiment, each of the wall openings 18 and 19 is sealed from the outside, as shown in FIG. 4, in the region of the common surface 15 between the adjacent partition members 13 and 14 of the two gear housings by a sealing ring 25, which is preferably an O-ring.

To simplify assembly of the uncomplicated and comparatively small sealing rings 25 still further, the wall openings of the one gear housing, for example, those of the angle drive housing 11, may each have an encircling bevel 26 at their ends facing the other gear housing. The bevels 26 provide partial accommodation of the sealing rings 25, while the partition of the adjacent gear housing, for example, the transmission housing 12, has a planar surface in the region of the wall openings.

Instead of an encircling bevel 26, the wall openings 18 and 19 may alternatively be provided with a corresponding annular groove, if desired.

It will be advantageous if sleeves 27 projecting from this gear housing are mounted, for example, press-fitted, in the wall openings encircled by a bevel 26 or by a matching annular groove to serve as guides for the sealing rings 25. Such a sleeve is also illustrated in the sectional view of FIG. 4.

Although the invention has been described herein with reference to specific embodiments, many modifications and variations therein will readily occur to those skilled in the art. Accordingly, all such variations and modifications are included within the intended scope of the invention.

We claim:

1. A transmission system for a motor vehicle having two powered axles comprising an engine disposed transversely to the direction of vehicle travel, a first housing for a transmission with its axis parallel to the engine shaft, a transmission output drive gear member acting a flywheel for driving a first powered axle, an angle drive connected to the transmission output drive gear member by a connecting shaft and arranged in a second housing which is separated from the first housing by a partition, a driveshaft leading from the angle drive to a second powered axle, bearing means for the connecting shaft provided in the partition, the second housing being mounted on the first housing adjacent to the transmission output drive gear, a supply of lubricant in each of the first and second housings for lubrication of the parts therein, the lubricant supplies in the two housings being separated from each other by the partition, at least one first opening in the partition providing a lubricant inlet leading from the first housing to the second housing, and at least one second opening in the partition providing a lubricant return leading from the second housing to the first housing, the second opening being located not below a first horizontal plane passing approximately through the bottom of the effective axial opening for the connecting shaft, the first opening being located above a second horizontal plane passing approximately through the top of the second opening, and at least one lubricant trap and conduit means in the first housing leading to the first opening and cooperating with the transmission output drive gear member which acts as a flywheel for the centrifugal lubrication so that lubricant projected by the transmission output drive gear member is diverted toward the first opening.

2. A transmission system according to claim 1 wherein the lubricant trap and conduit means is cast as an integral component of the first housing.

3. A transmission system according to claim 1 wherein the second housing is a separate component flanged laterally to the first housing and the partition comprises two separate adjacent partition members and including a sealing ring in the region of the common surfaces of the partition members of the two housings for sealing each of the first and second openings from the outside.

4. A transmission system according to claim 3 wherein the first and second openings in the partition member of one housing are each provided on the side toward the other housing with an encircling recess for partial accommodation of the corresponding sealing ring while the adjacent partition member of the other housing has a plane surface in the region of the first and second openings.

5. A transmission system according to claim 4 including a sleeve protruding from each of the first and second openings provided with a recess to serve as a guide.

* * * * *